United States Patent
Ikegami et al.

(10) Patent No.: US 6,770,124 B2
(45) Date of Patent: Aug. 3, 2004

(54) ZINC POWDER DISPERSIBLE IN WATER AND ZINC POWDER-CONTAINING WATER BASE PAINT

(75) Inventors: Makoto Ikegami, Osaka (JP); Makoto Homi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 44 days.

(21) Appl. No.: 10/441,346

(22) Filed: May 20, 2003

(65) Prior Publication Data

US 2004/0003752 A1 Jan. 8, 2004

(30) Foreign Application Priority Data

Jul. 5, 2002 (JP) ........................................ 2002-197606

(51) Int. Cl.[7] .............................. C09D 5/00; C09C 1/62
(52) U.S. Cl. ................................ 106/14.44; 106/14.13; 106/14.43; 106/403; 106/404; 428/405
(58) Field of Search .......................... 106/14.13, 14.43, 106/14.44, 403, 404; 428/405

(56) References Cited

U.S. PATENT DOCUMENTS

| 3,388,144 | A | * | 6/1968 | Musolf et al. ............... 556/427 |
|---|---|---|---|---|
| 4,172,737 | A | * | 10/1979 | Magee, Jr. ................... 106/403 |
| 4,518,726 | A | | 5/1985 | Kato et al. ................... 428/421 |
| 5,711,996 | A | * | 1/1998 | Claffey ..................... 427/388.4 |
| 5,868,820 | A | * | 2/1999 | Claffey ..................... 106/14.44 |
| 6,129,986 | A | | 10/2000 | Bessho et al. ................ 524/32 |
| 6,451,439 | B2 | * | 9/2002 | Okamoto et al. ............ 428/447 |
| 6,548,614 | B2 | * | 4/2003 | Mohri et al. .................. 528/14 |
| 6,576,082 | B2 | * | 6/2003 | Okamoto et al. ............ 156/329 |

FOREIGN PATENT DOCUMENTS

| JP | 52-63942 A | * | 5/1977 |
| JP | 2000-239570 | * | 5/2000 |

* cited by examiner

Primary Examiner—Anthony J. Green
(74) Attorney, Agent, or Firm—Howson and Howson

(57) ABSTRACT

A chromium-free, stable, water dispersion of zinc powder is produced by incorporation, into a zinc powder, of a silane coupling agent having a mercapto group in its molecules. The coupling agent is present in an amount ranging from 0.1 to 10 parts by weight for every 100 parts by weight of the zinc powder. The composition may be used in a water base paint.

5 Claims, No Drawings

ZINC POWDER DISPERSIBLE IN WATER AND ZINC POWDER-CONTAINING WATER BASE PAINT

FIELD OF THE INVENTION

This invention relates to dispersions of zinc powder in water, and to zinc powder-containing water base paints suitable for imparting corrosion-inhibiting and rust-inhibiting films onto metal surfaces.

BACKGROUND OF THE INVENTION

A water-based treatment agent, containing zinc powder and chromic acid as its principal components, has been widely used as a rust inhibitor on metallic surfaces. The treatment agent contains hexavalent chromium, which exerts a passivating action, allowing the zinc, which is otherwise liable to react with water over time, to be maintained in water as a stable dispersion over a long period of time. After a film is formed on an iron substrate, however, the hexavalent chromium allows the zinc to revert to an active state so that it can exert a sacrificial anti-corrosive action. The zinc prevents the elution of iron since zinc is electrochemically anodic to iron, and is eluted more readily than iron. At the same time the hexavalent chromium forms an anti-corrosion film.

Since the conventional treatment agent contains hexavalent chromium ions, which are hazardous, adverse effects on the human body, and environmental contamination, due to the elution of chromium from protective films have been a serious concern. Furthermore, legal restrictions have been imposed in various countries on the use of hexavalent chromium even in rust inhibitors for metallic surfaces. Accordingly a need exists for the establishment of a chromium-free technology.

In the general movement toward the use of water base paints, even zinc powder-containing paints are required to be water based. However, since zinc powder is liable to react with water in the absence of chromic acid, the market need for a dispersion of zinc powder in water, which is stable over a long period of time, has not been satisfied.

Accordingly, the principal objects of the invention are to make zinc powder stably dispersible in water for long period of time without the use of hexavalent chromium, and to provide an environmentally safer, zinc powder-containing, water base paint.

SUMMARY OF THE INVENTION

A water-dispersible, zinc powder-containing, material in accordance with the invention comprises zinc powder and a silane coupling agent, the molecules of which have a mercapto group. The coupling agent is present in the material in an amount in the range from 0.1 to 10 parts by weight for every 100 parts by weight of zinc powder. A water base paint can be made from a water dispersion of the above material.

In the above composition, the zinc powder remains stably dispersed in water for a long period of time, and the performance of the paint is not impaired by the reaction of zinc powder with water, or by the generation of a large amount of gas. Furthermore, since the silane coupling agent does not contain a hazardous substance such as hexavalent chromium and the like, adverse influences on the human body and environment are greatly reduced.

The mechanism by which the silane coupling agent having a mercapto group stably disperses zinc powder in water over a long period of time is not clearly understood. However, it is believed that the mercapto group in the molecules of the silane coupling agent becomes selectively chemically bonded with the zinc powder so that it prevents the reaction of zinc powder with water.

The stable dispersibility of the zinc powder in water, using a silane coupling agent with a mercapto group makes it possible to produce a chromium-free, zinc powder-containing water base paint.

DETAILED DESCRIPTION OF THE PREFERRED EMBODIMENTS

The zinc powder used in the dispersion in accordance with the invention is not limited to any particular range of particle diameters or shapes. For example, the particles can be spherical, flat, rod-shaped, or in any of a wide variety of forms. Some forms are more desirable than others, however. For example in the case of the flat form, the zinc powder has a superior coating effect on the surface to which it is applied so that it has superior rust-preventing performance.

This flat-shaped zinc powder particles are obtained by a developing and elongation process, using a ball mill, an attritor or the like. The average aspect ratio (average of long dimension divided by thickness) is preferably 10 or more.

In developing and elongating the zinc powder, the associated silane coupling agent is used as a grinding assistant in such a manner that the zinc surface is directly coated by the coupling agent. Additionally, as a general grinding assistant, saturated fatty acid such as stearic acid or the like, and unsaturated fatty acid such as oleic acid or the like may be used.

Furthermore, when the surface of the zinc powder is coated with the above-mentioned general grinding assistant, the surface may be treated by the silane coupling agent in a kneading process or the like.

This kneading process may be performed in the presence of an organic solvent. However, it is particularly advantageous to use a water-soluble solvent, since a processed slurry of dispersed zinc powder can be developed in water base paint as it is. Of course, after processing the kneading using a water-insoluble solvent, the solvent may be dried and removed, and then the processed dispersed zinc powder may be mixed with water.

Suitable water-soluble solvents include glycol series solvents such as propylene glycol, ethylene glycol and the like, alcohol series solvents such as ethanol, isopropanol and the like, and the series of ethylene glycol ethers known by the trademark CELLOSOLVE, for example ethylene glycol monomethyl ether (Methyl CELLOSOLVE) or ethylene glycol monobutyl ether (Butyl CELLOSOLVE).

If the molecule of the silane coupling agent used in the invention contains a mercapto group, other reactive groups and substituting groups are not limited particularly. Suitable silane coupling agents include γ-mercapto propyl trimethoxysilane, γ-mercapto propyl methyl dimethoxysilane and the like. Two or more types of silane coupling agents may be used in the same zinc powder material.

The amount of the silane coupling agent added to the zinc powder is preferably 0.1 to 10 parts by weight for every 100 parts by weight of zinc powder. An amount of silane coupling agent less than 0.1 parts of weight is insufficient to process the surface of the zinc powder and does not afford sufficient stability of the zinc powder in water. An amount of silane coupling agent in excess of 10 parts by weight is excessive and its cost outweighs its advantages.

The zinc powder according to the invention may be used with resin to produce a water base paint, and the zinc powder-containing water base paint can be produced by conventional known paint-making methods.

Suitable resins for the water base paint include, for example, inorganic series resins such as silicate of soda, ethyl silicate and the like, and organic resins such as acrylic resin, urethane resin, epoxy resin, silicone resin and the like. Although only one type of resin is usually required, two or more different types of resin may be used together. In the case of inorganic resins, the presence of numerous voids allows the zinc to be brought into direct contact with the metal surface, so that the sacrificial anti-corrosive action of the zinc can be realized.

Other additives may be included in the zinc powder-containing water base paint. For example, a different metallic powder such as aluminum flakes, a water-soluble solvent such as an alcohol solvent, CELLOSOLVE solvent, a glycol solvent, and paint additives such as pigment, dye, defoaming agent, or the like may be added. Aluminum flakes are particularly useful because they prevent the occurrence of white oxides in zinc powder.

Although the zinc powder composition according to the invention can exist stably in water, and is preferably used in water base paint, the zinc powder composition may also be used in a solvent type paint without any problems.

The invention will now be described in detail with reference to a number of examples and comparative examples. It should be understood, however, that the invention is not limited to the specific compositions of the examples.

EXAMPLE 1

Flat zinc powder (having an average long dimension of 15 $\mu$m and an average thickness of 0.5 $\mu$m) and γ-mercapto propyl trimethoxysilane were mixed and agitated in propylene glycol for three hours in accordance with the formula given in Table 1 below. A zinc powder-containing slurry, in which the surface of zinc powder was treated by γ-mercapto propyl trimethoxysilane, was obtained. The zinc powder-containing slurry was subjected to the following tests and the results of the tests are shown in Table 1 by marks the meanings of which are explained below Table 1.

Dispersibility in Water

An amount of the zinc powder-containing slurry containing 10 g. of the zinc powder was placed in a 200 ml flask. 100 ml. of pure water was added to the slurry and the mixture was well agitated. After agitation, the dispersibility of the mixture in water was observed visually.

Water Dilution Stability

An amount of the zinc powder-containing slurry containing 10 g. of the zinc powder was placed in a 200 ml conical flask. 100 ml of pure water was added to the slurry and the mixture was well agitated. After agitation, a measuring pipet with a rubber stopper was attached to the conical flask, and the flask and pipet assembly was left standing at 20° C. 24 hours later the amount of generated gas was measured.

Storage Stability of Paints 30 parts by weight of lithium silicate was added to a quantity of zinc powder-containing slurry containing 30 parts by weight of the zinc powder. 20 parts by weight of pure water was added to the mixture, and the mixture was agitated well to produce a water base paint. This paint was stored at 20° C. for three months. The conditions of the obtained paint was then observed visually.

Corrosion Resistance

The paint produced as in the storage stability test was uniformly applied to a previously degreased soft steel plate with a bar coater so that the film thickness of the paint during drying was 5 $\mu$m. Then, the soft steel plate was subjected to a preliminary drying step at 120° C. for 15 hours. After that, the plate was subjected to baking to obtain a test panel. The test panel was subjected to a saltwater spray test in accordance with JIS-Z 2371, and rust generation conditions were observed visually.

EXAMPLES 2 to 8

Seven zinc powder-containing slurries were obtained by mixing and agitating the components shown in Table 1 below. The zinc powder-containing slurries thus obtained were subjected to the same several tests as in Example 1, and the results are shown in Table 1.

COMPARATIVE EXAMPLES 1 to 4

Four more zinc powder-containing slurries were prepared as comparative examples in accordance with the formulations shown in Table 1, by mixing and agitating the designated components. The slurries thus obtained were subjected to the same tests as in Example 1, and the results are shown in Table 1.

TABLE 1

|  | EX1 | EX2 | EX3 | EX4 | EX5 | EX6 | EX7 | EX8 | comp. example 1 | comp. example 2 | comp. example 3 | comp. example 4 |
| --- | --- | --- | --- | --- | --- | --- | --- | --- | --- | --- | --- | --- |
| Formulation |  |  |  |  |  |  |  |  |  |  |  |  |
| Zinc powder | 100 | 100 | 100 | 100 | 100 | 100 | 80 | 80 | 100 | 100 | 100 | 100 |
| Aluminum flake | — | — | — | — | — | — | 20 | 20 | — | — | — | — |
| γ-mercapto propyl trimethoxy silane | 2 | 2 | — | 2 | 0.1 | 10 | 2 | 2 | — | — | — | 15 |
| γ-mercapto propyl methyl dimethoxy silane | — | — | 2 | — | — | — | — | — | — | — | — | — |
| γ-chloropropyl trimethoxy silane | — | — | — | — | — | — | — | — | — | 2 | — | — |
| γ-aminopropyl trimethoxy silane | — | — | — | — | — | — | — | — | — | — | 2 | — |
| Propylene glycol | 60 | 60 | 60 | — | 60 | 60 | 60 | — | 60 | 60 | 60 | 60 |

TABLE 1-continued

|  | EX1 | EX2 | EX3 | EX4 | EX5 | EX6 | EX7 | EX8 | comp. example 1 | comp. example 2 | comp. example 3 | comp. example 4 |
|---|---|---|---|---|---|---|---|---|---|---|---|---|
| Ethylene glycol | — | — | — | 60 | — | — | — | 60 | — | — | — | — |
| Surfactant | — | 1 | 1 | 1 | 1 | 1 | 1 | 1 | 1 | 1 | 1 | 1 |
| Test Results |  |  |  |  |  |  |  |  |  |  |  |  |
| Dispersibility in water | ○ | ◎ | ◎ | ◎ | ◎ | ◎ | ◎ | ◎ | Δ | ○ | ○ | ◎ |
| Water dilution stability | ◎ | ◎ | ◎ | ◎ | ◎ | ◎ | ◎ | ◎ | X | X | X | ◎ |
| Storage stability | ○ | ◎ | ○ | ◎ | Δ | ○ | ◎ | ◎ | X | X | X | ○ |
| Corrosion resistance SST 1000 hours | ○ | ○ | ○ | ○ | ○ | ○ | ◎ | ◎ | X | X | X | ○ |

*1: All numeric values in Table 1 are shown as parts by weight.
*2: Dispersibility in water: ◎ very excellent, ○ excellent, Δ a little bad
Water dilution stability: ◎ no generation of gas, ○ slight generation of gas, Δ a little more generation of gas, X frequent generation of gas
Storage stability: ◎ no generation of gas, ○ slight generation of gas, Δ a little more generation of gas, X frequent generation of gas
Corrosion resistance (SST 1000 hours): ◎ no generation of red rust, ○ 0.1% or less in total generation ratio of red rust, Δ 0.1 to 1% in total generation ratio of red rust, X 1% in total generation ratio of red rust.

As apparent from the results obtained for Examples 1 to 8 and Comparative Examples 1 to 4 shown in Table 1, by treating surfaces of zinc powders by a silane coupling agent the molecules of which contain a mercapto group, the dispersibility in water and water dilution stability are remarkably improved. Furthermore, a paint using zinc powder treated by a silane coupling agent the molecules of which contain a mercapto group exhibits significantly improved storage stability and corrosion resistance, showing that the zinc powder is suitable as the pigment of a water base paint.

In summary, the water-dispersible zinc powder containing material according to the invention, containing zinc powder and a silane coupling agent the molecules of which have a mercapto group. The coupling agent is present in an amount from 0.1 to 10 parts by weight for every 100 parts by weight of zinc powder. When the material is dispersed in water the generation of hydrogen gas is prevented for a long period of time.

When the zinc powder-containing material is used in a water base paint it becomes possible to make a chromium-free, zinc powder-containing, water base paint in which the generation of hydrogen gas is inhibited.

We claim:

1. A water-dispersible, zinc powder-containing, material comprising zinc powder particles and silane coupling agent molecules having a mercapto group, wherein the zinc powder particles are coated by said coupling agent and wherein the coupling agent is present in said material in an amount in the range from 0.1 to 10 parts by weight for every 100 parts by weight of zinc powder.

2. A zinc powder-containing water base paint comprising a water dispersion of a zinc powder-containing material comprising zinc powder particles and silane coupling agent molecules having a mercapto group, wherein the zinc powder particles are coated by said coupling agent and wherein the coupling agent is present in said material in an amount in the range from 0.1 to 10 parts by weight for every 100 parts by weight of zinc powder.

3. The material according to claim 1, wherein said silane coupling agent is selected from the group consisting of γ-mercapto propyl trimethoxy silane and γmercapto propyl methyl dimethoxysilane.

4. The material according to claim 1, further comprising aluminum flake.

5. The material according to claim 1, further comprising propylene glycol or ethylene glycol.

* * * * *

UNITED STATES PATENT AND TRADEMARK OFFICE
CERTIFICATE OF CORRECTION

PATENT NO. : 6,770,124 B2
DATED : August 3, 2004
INVENTOR(S) : Makoto Ikegami and Makoto Homi It is certified that error appears in the above-identified patent and that said Letters Patent is hereby corrected as shown below:

Column 1,
Line 44, "for long" should read -- for a long --

Column 6,
Line 41, the second occurrence of "γmercapto" should read -- γ-mercapto --

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,770,124 B2
DATED : August 3, 2004
INVENTOR(S) : Makoto Ikegami and Makoto Homi It is certified that error appears in the above-identified patent and that said Letters Patent is hereby corrected as shown below:

<u>Title page,</u>
Item [73], Assignee, add -- and Nihon Ruspert Co., Ltd., Osaka, Japan --.

Signed and Sealed this

Eighteenth Day of April, 2006

JON W. DUDAS
*Director of the United States Patent and Trademark Office*